United States Patent
Starkey

(10) Patent No.: US 6,417,766 B1
(45) Date of Patent: Jul. 9, 2002

(54) METHOD AND APPARATUS FOR IDENTIFYING REMOTE SENDING UNITS IN A TIRE PRESSURE MONITOR SYSTEM OF A VEHICLE USING SECONDARY MODULATION OF WHEEL ROTATION

(75) Inventor: Fred L. Starkey, Monroe, NC (US)

(73) Assignee: Schrader-Bridgeport International, Inc., Buffalo Grove, IL (US)

(*) Notice: Subject to any disclaimer, the term of this patent is extended or adjusted under 35 U.S.C. 154(b) by 0 days.

(21) Appl. No.: 09/758,734

(22) Filed: Jan. 11, 2001

Related U.S. Application Data

(60) Provisional application No. 60/176,164, filed on Jan. 14, 2000.

(51) Int. Cl.[7] .............................................. B60C 23/00
(52) U.S. Cl. ...................... 340/447; 340/442; 340/444; 340/445; 340/539; 73/146.5
(58) Field of Search ................. 340/447, 442, 340/443, 444, 445, 438, 449, 539, 671, 672; 73/146, 146.3, 146.4, 146.5; 116/34 R, 34 A, 34 B, 35 R; 180/197, 271

(56) References Cited

U.S. PATENT DOCUMENTS

| | | | |
|---|---|---|---|
| 4,237,728 A | * 12/1980 | Betts et al. ................. | 73/146.5 |
| 4,319,220 A | * 3/1982 | Pappas et al. .............. | 340/447 |
| 5,463,374 A | 10/1995 | Mendez et al. ............. | 340/442 |
| 5,483,827 A | 1/1996 | Kulka et al. ................ | 73/146.5 |
| 5,600,301 A | * 2/1997 | Robinson, III ............. | 340/442 |
| 5,602,524 A | 2/1997 | Mock et al. ................ | 340/447 |
| 5,661,651 A | * 8/1997 | Geschke et al. ............. | 701/88 |
| 5,731,754 A | 3/1998 | Lee, Jr et al. ............... | 340/447 |
| 5,838,229 A | 11/1998 | Robinson, III ............. | 340/442 |
| 5,963,128 A | * 10/1999 | McClelland ................ | 340/447 |
| 6,018,993 A | 2/2000 | Normann et al. ........... | 731/146.5 |
| 6,043,738 A | 3/2000 | Stewart et al. .............. | 340/447 |
| 6,181,241 B1 | 1/2001 | Normann et al. ........... | 340/447 |
| 6,204,758 B1 | * 3/2001 | Wacker et al. .............. | 340/444 |
| 6,259,361 B1 | * 7/2001 | Robillard et al. ........... | 340/447 |
| 6,278,363 B1 | * 8/2001 | Bezek et al. ................ | 340/442 |

FOREIGN PATENT DOCUMENTS

EP           931679 A1    7/1999

\* cited by examiner

*Primary Examiner*—Daniel J. Wu
*Assistant Examiner*—Toan Pham
(74) *Attorney, Agent, or Firm*—Brinks Hofer Gilson & Lione

(57) ABSTRACT

A remote tire monitoring system (10) includes tire monitors (12) positioned at respective wheels of a vehicle (V) for transmitting radio signals modulated by tire data and modulation means positioned above near the tire monitors for imposing a secondary modulation on the radio signals. A receiver (14) receives the radio signals and recovers the tire data (26) from the radio signals and associates the tire monitor with the respective wheels of the vehicle using the secondary modulation.

17 Claims, 3 Drawing Sheets

METHOD AND APPARATUS FOR IDENTIFYING REMOTE SENDING UNITS IN A TIRE PRESSURE MONITOR SYSTEM OF A VEHICLE USING SECONDARY MODULATION OF WHEEL ROTATION

This application claims benefit of Ser. No. 60/176,164 filed Jan. 14, 2000.

BACKGROUND

This invention relates to the programming of a central receiving unit in a remote tire monitoring system to identify sending units such as radio frequency tire pressure sending units associated with the vehicle.

U.S. Pat. No. 5,600,301, assigned to the assignee of the present invention, discloses a tire pressure monitoring system that includes sending units associated with each tire of a vehicle and a central receiving unit. Each of the sending units includes a respective radio frequency (RF) transmitter that transmits an RF signal. The RF signal includes both an identifier code and an indicator of tire pressure. Additionally, each of the sending units includes a magnet sensor. When the receiving unit is placed in a learn mode, a magnet is used to activate each sending unit of the vehicle in a predetermined order. The receiver learns the identifiers associated with the respective tires based upon the sequence of activation of the sending units. This approach is found reliable in use, while it requires the use of a suitable magnet for activating the sending units.

In one patent application assigned to the assignee of the present application, a remote tire pressure monitoring system includes a sending unit for each monitored tire. The sending units transmit RF signals including an identifier and a pressure indicator. A receiver operates in a learn mode in which the receiver associates specific identifiers either with the vehicle or with specific tires. During the learn mode, the vehicle is driven at a speed above a threshold speed and identifiers are associated with either the vehicle or the respective tires of the vehicle only if they persist for a selected number of signals or frames during the learning period. In one example, the tires are inflated with different pressures according to a predetermined pattern and the pressure indicators of the receive signals are used to associate individual tire positions with the respective sending units.

Other techniques for identifying the position of a transmitting tire monitor are known. In U.S. Pat. Nos. 5,483,827 and 5,661,651, the frequency of transmission is used to identify and distinguish the tire monitor which originated the transmission.

Other techniques for a programming a receiving unit with tire position information involve manual entry of the information. This has been done by using a keypad to enter both the tire monitor identification information and tire position information. This has also been done by using a bar code to read the tire monitor identification information directly from the tire monitor while still manually entering the tire position information.

The approaches discussed above are not fully automatic. An automatic technique is desired to improve reliability and convenience for the user.

SUMMARY

By way of introduction only, the method and apparatus of the following description identify the position of tire monitors attached to a vehicle using a secondary modulation of the radio signals transmitted by each monitor. Each monitor imposes a primary modulation on signals it transmits using tire data related to tire pressure. In addition, other vehicle components such as metallic masses near the wheels impose secondary modulation on the radio signals transmitted by the tire monitor. This secondary modulation may be learned and decoded to identify the position associated with a signal received at the receiver. In addition, additional components may be attached near the wheel to modify and control the secondary modulation for subsequent retrieval by the receiver.

The foregoing discussion of the preferred embodiments has been provided only by way of introduction. Nothing in this section should be taken as a limitation on the following claims, which define the scope of the invention.

DETAILED DESCRIPTION OF THE PRESENTLY PREFERRED EMBODIMENTS

Figure 1:
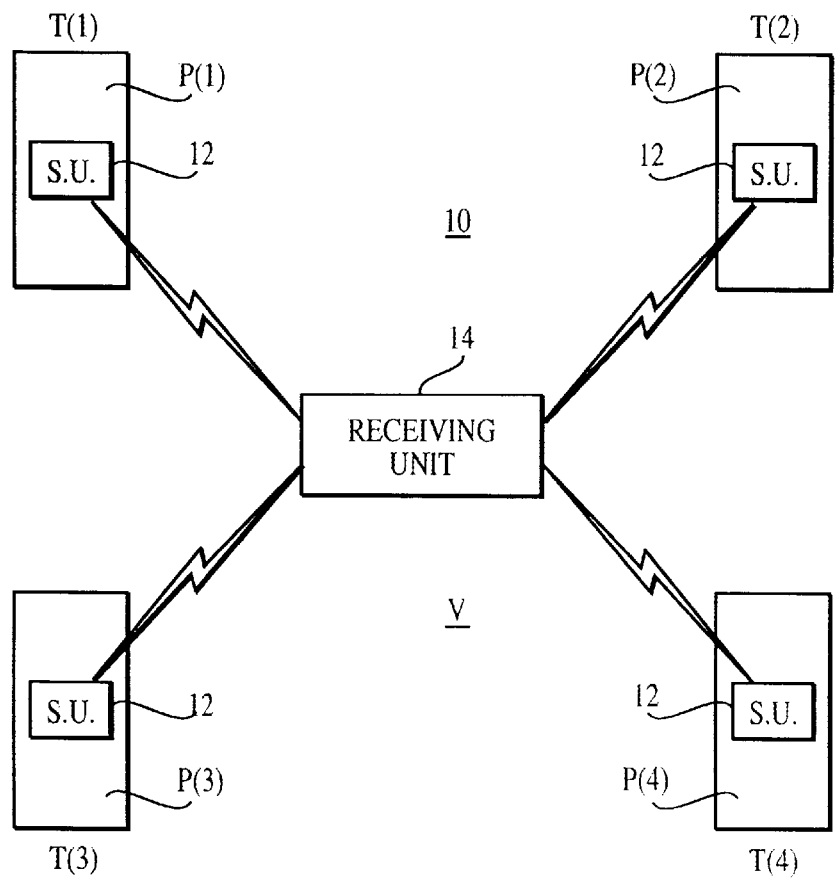
FIG. 1 is a schematic view of a remote tire pressure monitoring system.

Turning now to the drawings, FIG. 1 shows a schematic view of a vehicle V that includes in this example four tires. The vehicle V includes a remote tire pressure monitoring system 10 that in this example includes four sending units or tire monitors 12 and a receiving unit 14. Each of the plurality of sending units is associated with wheels positioned on the vehicle V. Each of the tire monitors 12 includes a battery powered radio frequency transmitter that periodically transmits radio frequency signals indicative of pressure in the associated tire. In this example, the tires are labeled T(1), T(2), T(3), T(4), and the associated tire pressures are identified as P(1), P(2), P(3), P(4). The receiving unit 14 receives radio frequency signals from the sending units 12 and provides a warning to the operator of the vehicle V when the indicated tire pressure of any of the tires is outside a predetermined range.

This invention can be used with the widest variety of sending units or tire monitors 12 and receiving units 14. For this reason, these components will be described only briefly here.

Figure 2:
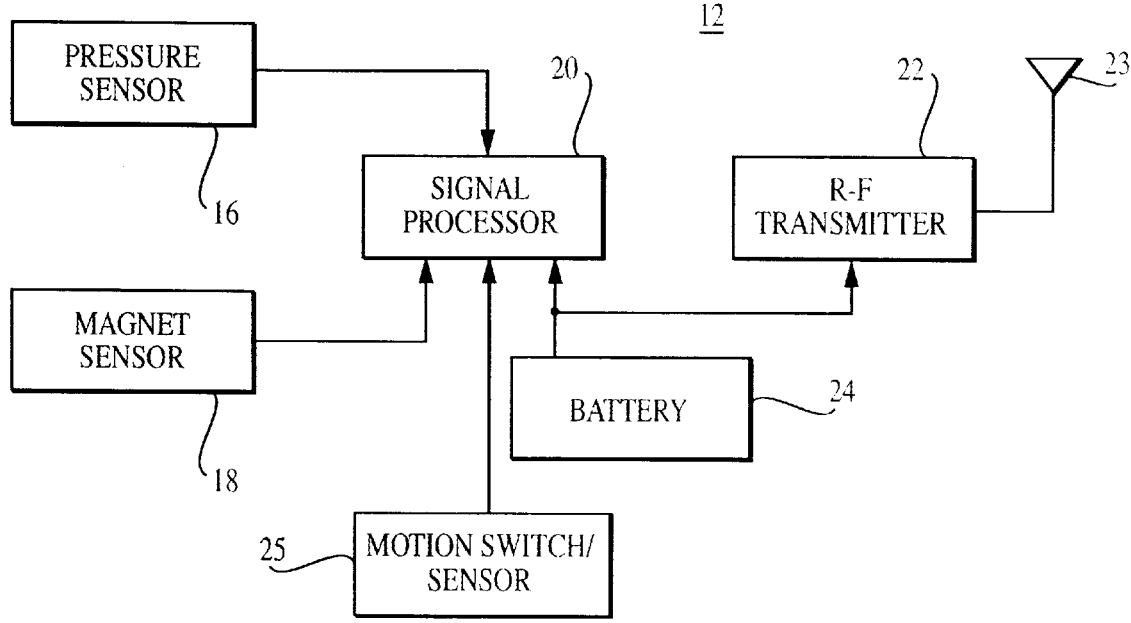
FIG. 2 is a block diagram of one of the sending units of FIG. 1.

FIG. 2 is a block diagram of a sending unit or a tire monitor 12. The tire monitor 12 can include a pressure sensor 16, a magnet sensor 18, a signal processor 20, a radio frequency (RF) transmitter 22 and a motion switch or sensor 25. A battery 24 provides operational power for the tire monitor 12. The pressure sensor 16 from the sensor is configured to produce data representative of a tire characteristic. In the illustrated embodiment, the pressure sensor 16 is a tire pressure sensor and the tire characteristic is pneumatic pressure of the tire. In other embodiments, the detected tire characteristic may be tire temperature, number of tire rotations or other characteristics. The pressure sensor 16 produces sensor data or a sensor signal indicative of the tire characteristic for provision to the signal processor 20.

The magnet sensor 18 provides a signal to the signal processor 20 in response to a magnetic actuation externally imposed on the tire monitor 12. For example, the magnet sensor 18 may be a reed switch. The magnet sensor 18 may be actuated to place the tire monitor 12 and receiving unit 14 into a learn mode for initializing position of the tire monitors 12 on the vehicle V. The motion switch/sensor 25 provides a signal to the signal processor 20 when the tire monitor, mounted on the wheel of the vehicle, is in motion. The motion switch/sensor 25 may be adjusted or programmed to provide the signal to the signal processor 20 when the speed of the vehicle exits a certain threshold.

The signal processor 20 controls operation of the tire monitor 12. In one embodiment, the signal processor 20 comprises a microcontroller and a memory for storing data and instructions for operating the tire monitor 12. In an alternative embodiment, the signal processor 20 comprises an application specific integrated circuit (ASIC) implementing on a single semiconductor chip the circuitry necessary to perform the functions associated with the signal processor 20. In particular, the signal processor 20 receives data or signals from the pressure sensor 16, the magnet sensor 18 and the motion switch/sensor 25 and formats this data as a message for transmission to a remote receiver. The message may also include identification information for the tire monitor 12. The message is provided to the transmitter 22 which, in conjunction with an antenna 23, transmits radio signals to the remote receiver.

The transmitter 22 operates by modulating a carrier signal with data provided by the signal processor. Any suitable modulation technique, such as amplitude modulation or frequency modulation, may be used to transmit the data. This modulation is referred to herein as a primary modulation of the radio signals transmitted by the tire monitor 12.

The tire monitors 12 thus form, individually and collectively, tire monitor means positioned at respective wheels of the vehicle V for transmitting radio signals modulated by tire data. Other tire monitor means may be embodied using only some of the components of the tire monitor 12 illustrated in FIG. 4 or may include additional components for performing other functions as well. In general, the tire monitor means includes a data sensor such as a pressure sensor, temperature sensor, and the like, and a transmitting circuit which transmits radio signals to convey the data collected by the data sensor.

Figure 3:
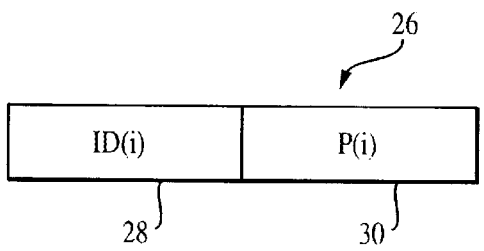
FIG. 3 is a block diagram of one of the RF signals generated by the sending unit of FIG. 2.

In this example, the RF signal transmitted by the RF transmitter 22 can include tire data having the format shown in FIG. 3. As shown in FIG. 3, the tire data 26 includes two components. The tire data 26 includes an identifier 28 and a pressure indicator 30. The identifier 28 in this embodiment includes a digital variable D(i) that is set equal to an identification code assigned to the respective sending unit 12. Each of the tire monitors 12 of the vehicle V will therefore have a different identifier 28. The pressure indicator 30 provides an indication of tire pressure in the respective tire. Preferably, the pressure indicator 30 takes the form of the digital variable P(i) equal to a measure of tire pressure, though other techniques are possible. In this example, each of the sending units 12 transmits eight frames of tire data 26 per block, and one block of frames is transmitted every minute while the vehicle is in motion. Further, by actuation of the magnet sensor 18, the respective sending unit transmits 40 frames within a short period of time. Other transmission formats and procedures may be selected.

Figure 4:
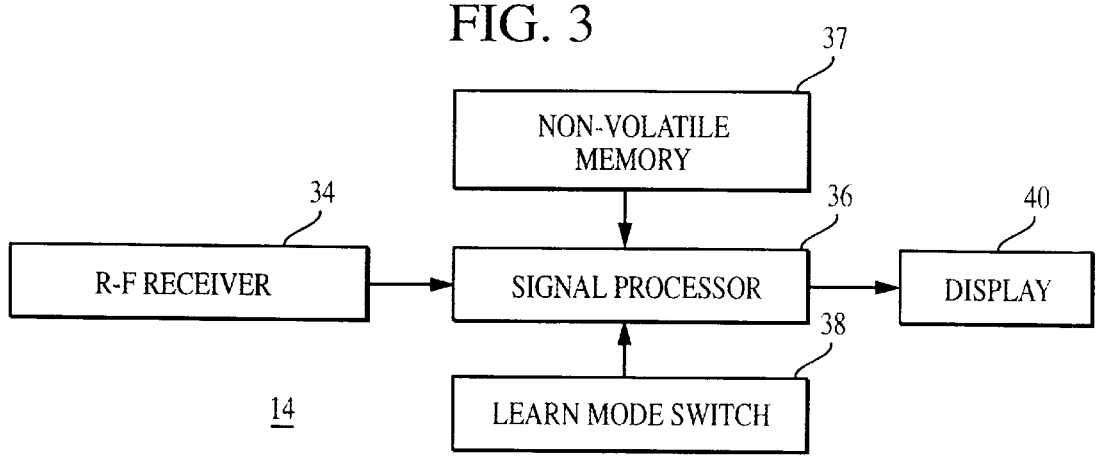
FIG. 4 is a block diagram of the receiving unit of FIG. 1.

As shown in FIG. 4, the receiving unit 14 includes an RF receiver 34, a signal processor 36, non-volatile memory 37, a learn mode switch 38 and a display 40. The RF receiver 34 is operative to receive radio signals transmitted by the sending units or tire monitors 12. Structure and operation of the RF receiver 34 will be described below in greater detail in conjunction with FIG. 6. Data conveyed on the RF signals and received by the RF receiver 34 is conveyed to the signal processor 36. The signal processor controls operation of the receiver 14 in response to data and instructions contained in memory such as the non-volatile memory 37. The signal processor controls the display 40 to provide an indication of conditions in the tire monitor system 10 (FIG. 1). For example, the signal processor 36 can automatically provide a display if the receive signals indicate tire pressure for one of the tires T(1) ... T(4) is outside of a predetermined range. The learn mode switch 38 is used to place the receiving unit 14 in a learn mode, in which the receiving unit 14 automatically associates the identifiers of each of the sending units 12 associated with the vehicle V with respect to the tires. In learn mode, a particular learn signal or function code indicative of the learn mode is sent by the actuated tire monitor.

Rotation of the road wheel assembly, including the tire monitor 12, induces fluctuations in the overall signal strength of the signal received at the receiver 14. This may be considered a secondary modulation of the signal. Other vehicle components, most notably metallic masses such as brake calipers, impose specific patterns of modulation. Thus, the secondary modulation conveys information about the structure surrounding the wheel and tire monitor.

Figure 5:
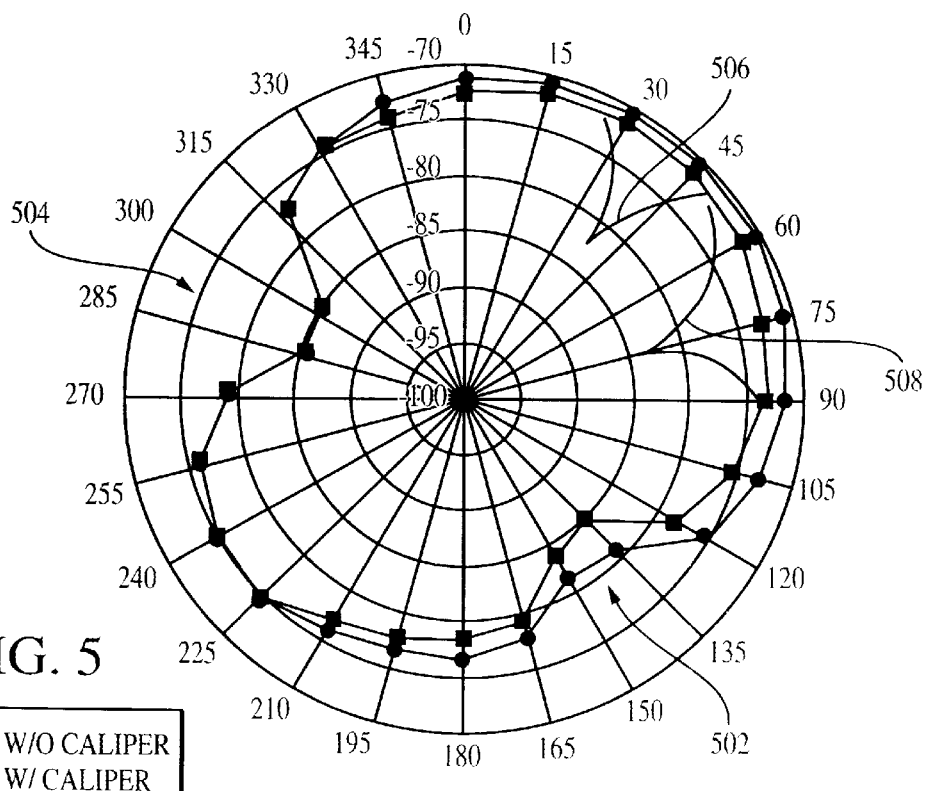
FIG. 5 is a block diagram illustrating secondary modulation of radio signals and the remote tire monitoring system of FIG. 1.

FIG. 5 illustrates received signal strength at the RF receiver 34 as a function of circumferential wheel displacement for a vehicle wheel in the vicinity of a brake caliper. The receive signal strength is indicated as a relative displacement of the measured values from the center of the circle in FIG. 5. A greater received signal strength is indicated by a point further from the center of the circle and, similarly, a lesser received signal strength is indicated by a point radially closer to the center of the circle. The data in FIG. 5 are experimentally obtained data for a left rear wheel on a vehicle with and without a brake caliper present, as indicated by the key in FIG. 5.

The characteristic pattern of FIG. 5 contains two nulls in received signal strength as the position of a tire monitor on the wheel progresses clockwise around the circumference of the wheel. Circumferential displacement of the tire monitor is indicated by the numbers on the perimeter of the circle. A first null 502 occurs at approximately 135 degrees angular displacement. A second null 504 indicates between 285 and 300 degrees angular displacement. These nulls represent dips or attenuations in received signal strength due to the presence of vehicle components such as metallic masses like brake calipers in the vicinity of the tire monitor mounted on the wheel as it rotates. In previous implementations of tire monitor systems, such variations in received signal strength have been considered to be noise or interference. However, the inventor has recognized that such patterns or variations may be associated with individual wheels to provide position location information for tire monitors on the vehicle.

At the receiving unit 14 of the system, particular secondary variations unique to a particular tire monitor are associated with a particular wheel position. In this manner, the position and identification information for the transmitting tire monitor can be associated with the transmitted tire data, such as tire pressure data. By detecting the secondary variations, the need to transmit an identifier for the tire monitor is avoided. The secondary variations are unique to each wheel position on the vehicle and therefore uniquely identify the position of the tire with which the transmitted tire data is associated. Only the tire data need be transmitted, possibly with a mode signal or function code indicating learn mode or a normal mode of operation. This reduces the amount of data transmitted, reducing power consumption in the tire monitor and reducing noise in the radio environment of the system.

By storing data corresponding to the variable pattern of received signal strength or other signal characteristic, and subsequently comparing this same characteristic to a transmission received from a tire monitor, the position of the transmitting tire monitor on the vehicle may be determined. If the currently received data correlates with a stored pattern of data, the position of the wheel on the vehicle matches the position associated with the stored data. If the correlation is poor, the position does not match.

Typically, the position of the tire monitors 12 will have to be initialized in the receiving unit 14. This is accomplished by entering the learn mode, for example by magnetically actuating the magnet sensor 18 of the tire monitor 12. In other embodiments, this could be done by actuating a low-frequency (e.g., 150 kHz) transponder using radio frequency identification (RF ID) tag technology. In response to this actuation, the tire monitor sends a unique transmission indicating that it is in learn mode and that the receiving unit 14 may update position information stored for the actuated tire monitor.

In addition to using the variation in signal characteristic due to the vehicle components and structure, unique components and structures may be placed at each wheel position to further control the signal transmission characteristic. For example, in the exemplary embodiment of FIG. 5, a component may be positioned to create an additional null 506 in the received signal strength characteristic. In addition, yet another component may be placed to create another null 508 at another position in the received signal strength characteristic. As the signal is received at the receiver 14 of the tire monitor system 10, the received signal strength will have a repeated pattern of variation due to motion of the transmitting tire monitor past the structures located in the vicinity of the wheel. These structures may reflect or redirect the transmitted signal power or they may absorb the transmit signal power, producing the nulls 502, 504, 506, 508 illustrated in FIG. 5.

If unique structures are incorporated to modify the secondary modulation pattern at a wheel, preferably these unique structures are incorporated as features of existing components such as the brake caliper, the brake disk dust cover, etc. Alternatively, the added structure can be an additional component added to the wheel or strut assembly or any other structure within the vicinity of the wheel. The structure may be as simple as a piece of reflective tape positioned in the wheel well near the tire monitor. Such structures, whether an inherent part of the vehicle such as the brake caliper or added to the vehicle to create a secondary variation, form modulation means positionable near the tire monitor 12 for imposing a secondary modulation on the radio signals transmitted by the tire monitor 12.

Figure 6:
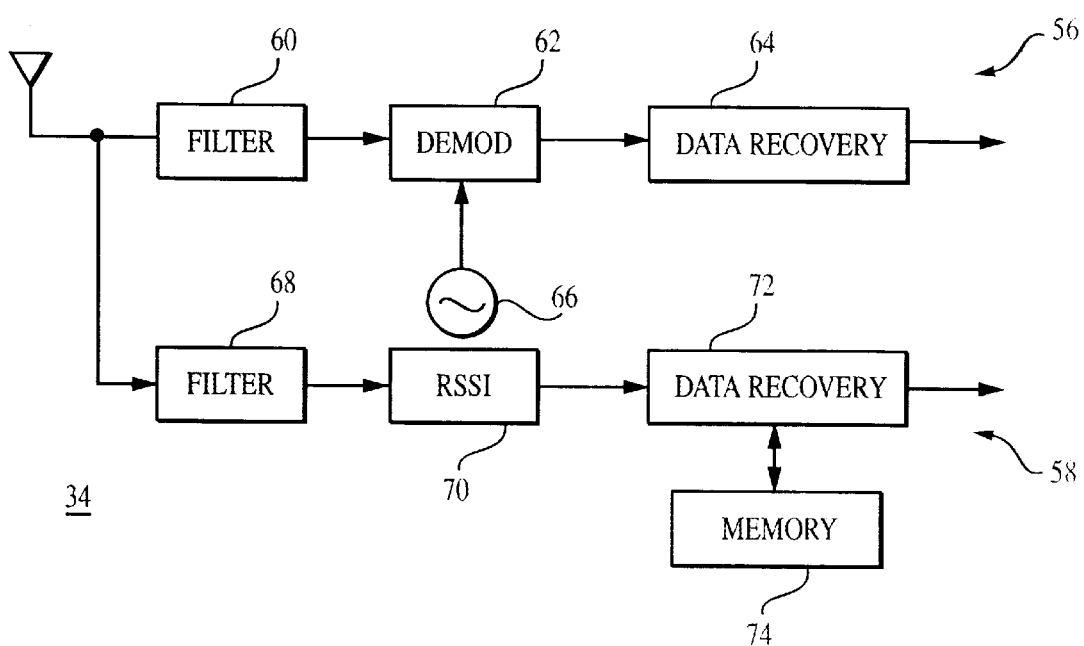
FIG. 6 is a block diagram of a receiver for use in the receiving unit of FIG. 4.

FIG. 6 is a block diagram showing a proposed structure for the receiver 34 of FIG. 4. The receiver 34 forms a receiving means for receiving radio signals transmitted by the tire monitors 12. The receiver 34 in the exemplary embodiment of FIG. 6 includes a first demodulation circuit 56 and a second demodulation circuit 58. The first demodulation circuit 56 includes a first filter 60, a demodulator 62 and a data recovery circuit 64 and a local oscillator 66. The second demodulation circuit 58 includes a second filter 68, a received signal strength indication circuit 70, a second data recovery circuit 72 and a memory 74.

The first demodulation circuit 56, including the filter 60, the modulator 62, the data recovery circuit 64 and the local oscillator 66, operates to receive the data signals transmitted by the tire monitors 12 at the wheels of the vehicle. The first demodulation circuit 56 demodulates the primary modulation of the radio signals. The filter 60 is typically a bandpass filter with a passband centered around the transmit frequency used by the tire monitors. Signals outside this passband are considered noise and are attenuated. The demodulator 62, in response to a carrier signal generated by the oscillator 66, demodulates the filtered signal produced by the filter 60. Any suitable modulation and demodulation scheme may be used in the tire monitor system 10. The demodulated data are provided by the demodulator 62 to the first data recovery circuit 64. The data recovery circuit 64 recovers the data including the digital variable ID(i) that contains the identification code assigned to the respective sending unit and the pressure variable P(i) which contains the measure of tire pressure transmitted by the tire monitor 12 (FIG. 3).

Thus, in one embodiment, the demodulator 62 and the data recovery circuit 64 form a demodulation means for recovering the tire data from the radio signals. As noted, in the present embodiment, the identification code may not be transmitted and the secondary variations may be used by the receiver 34 to identify the tire data or to associate the tire data with a position on the vehicle. This recovered data is conveyed to the signal processor 36 of the receiving unit 14 containing the receiver 34.

The second demodulation circuit 58 includes the filter 68, received signal strength indication (RSSI) circuit 70 and second data recovery circuit 72. This circuit 58 demodulates the secondary modulation data which defines position data for the transmitting time monitor 12. The filter 68 operates as a low pass filter to attenuate signals beyond the low frequency pass band suitable for detecting the secondary modulation information in the received signal. Since the frequency of modulation is related to wheel speed of the vehicle, this modulated information is received at a relatively low frequency.

The RSSI circuit 70 detects the relative signal strength of the signal passed by the filter 68. This signal has a signal strength comparable to that illustrated in FIG. 5. This signal has a relatively high amplitude values corresponding to portions of the circumferential travel of the tire monitor where its transmitted signal is not attenuated or reflected. Similarly, this signal will have portions such as the nulls 502, 504, 506, 508 (FIG. 5) where, during the circumferential travel of the tire monitor 12, its signal is attenuated, or absorbed or reflected, limiting reception by the receiver 34. Suitable received signal strength indication circuits are well known.

The RSSI circuit 70 provides a received signal strength indication to the data recovery circuit 72. In response to this signal, the data recovery circuit 72 detects a bit pattern or data pattern corresponding to position data for the transmitting time monitor 12 which originated the transmission. In the illustrated embodiment, the data recover circuit 72 compares the received position data with stored position from the memory 74. The stored position data is previously learned and stored during a learn mode operation of the tire monitor system 10. The data recovery circuit 72 compares the received position data with the stored position data. If a match occurs, the receiver 14 has received tire data from a known tire monitor of the tire monitor system 10. If no match occurs, the received position data is noise or transmission from a tire monitor in another tire monitor system on an adjacent vehicle. Other techniques for data recovery may be used.

In one embodiment, then, the data recovery circuit 72 forms an identification circuit responsive to the secondary variations of the received carrier signal to identify a particular wheel location based on the secondary variations. In another embodiment, the RSSI circuit 70 and the data recovery circuit 72 form a decoding means responsive to secondary modulation of the radio signals received by the receiver for associating the tire data with respective wheel locations of the vehicle V.

In applications where metallic or other components are positioned near the tire monitor 12 to produce the unique pattern of secondary modulation of the transmitted signal from the tire monitor 12, the transmitted data will appear as a series of data bits having proportional characteristics. The duration of these data bits is a direct function of the wheel speed. That is, the duration is not an absolute value but will vary with time, being of shorter duration when the wheel and the vehicle are moving faster and of longer duration when the wheel and vehicle are moving more slowly. Thus, the data recovery circuit 72 preferably implements a ratiometric decoder which detects data based on the relative size or duration of received data bits to distinguish a logical one bit from a logical 0 bit.

From the foregoing, it can be seen that an improved tire monitor system for a vehicle such as an automobile has been described which transmits data from an automobile road wheel assembly via radio frequency communication. Through the monitoring and control of secondary modulation of the transmitted signal, signal variations which had previously been treated as noise or interference are instead used to provide self association between the identity of the transmitting tire monitor and the physical wheel location on the vehicle. This is accomplished without modification to the existing sensor and transmitter of the time monitor. Since the tire monitor is necessarily a cost sensitive item, this is a significant advantage.

While a particular embodiment of the present invention has been shown and described, modifications may be made. For example, any suitable technique for placing the tire monitor system in learn mode to initialize position data may be used with the method and apparatus in accordance with the invention. It is therefore intended in the appended claims to cover all such changes and modifications which fall within the true spirit and scope of the invention.

What is claimed is:

1. A method for operating a remote tire monitor system including a plurality of sending units associated with wheels positioned on a vehicle and a receiving unit, the method comprising:

at at least one of the sending units, transmitting radio signals including tire data related to a tire associated with the sending unit;

at the receiving unit, receiving the radio signals;

recovering the tire data from the radio signal;

detecting secondary variations in the radio signals; and associating a particular secondary variation with a particular wheel position.

2. The method of claim 1 wherein receiving the radio signals comprises:

detecting a primary modulation of a carrier signal transmitted by the particular sending unit; and detecting a secondary modulation of the carrier signal due to environmental variations associated with the particular wheel position.

3. The method of claim 2 wherein detecting a secondary modulation comprises:

detecting variation in the carrier signal associated with rotational movement of the particular sending unit past structures adjacent the particular wheel position.

4. The method of claim 1 further comprising:

comparing the secondary variations in the radio signals with stored data; and when the particular secondary variation for the particular wheel position matches stored data, associating the tire data with stored tire information for the particular sending unit.

5. The method of claim 1 further comprising:

comparing the secondary variations in the radio signals with stored data; and using the particular secondary variation, associating the tire data with a particular sending unit at the particular wheel position on the vehicle.

6. A remote tire monitoring system comprising:

a plurality of tire monitors associated with wheels of a vehicle and configured to transmit radio signals conveying tire data; and a receiver configured to receive the radio signals, the receiver including a circuit which detects secondary variations in the radio signals due to movement of the plurality of tire monitors.

7. The remote tire monitoring system of claim 6 further comprising:

one or more components positionable near respective tire monitors for imposing the secondary variations on the radio signals.

8. The remote tire monitoring system of claim 7 wherein the one or more components comprise metallic elements positionable along circumferential paths of the tire monitors on the wheels of the vehicle to alter the radio signals received by the receiver.

9. The remote tire monitoring system of claim 6 wherein the receiver comprises:

an identification circuit responsive to the secondary variations to identify a particular wheel location based on the secondary variations.

10. The remote tire monitoring system of claim 9 wherein the receiver further comprises:

a decoder which detects position data in the secondary variations.

11. The remote tire monitor system of claim 10 wherein the decoder comprises a ratiometric decoder responsive to the relative duration of bits of the duration data to decode the position data.

12. The remote tire monitoring system of claim 9 wherein the receiver further comprises:

a demodulator which demodulates the radio signals to receive the tire data.

13. A remote tire monitoring system comprising:

tire monitor means positioned at respective wheels of a vehicle for transmitting radio signals modulated by tire data;

modulation means positionable near the tire monitor means for imposing a secondary modulation on the radio signals; and receiving means for receiving the radio signals, the receiving means including:
  demodulation means for recovering the tire data from the radio signals, and
  decoding means responsive to the secondary modulation for associating the tire data with respective wheel locations of the vehicle.

14. The remote tire monitoring system of claim 13 wherein the tire monitor means comprises:
  a plurality of remote tire monitors mounted on the respective wheels of the vehicle and to monitor a tire condition and produce the tire data, each remote tire monitor transmitting respective radio signals.

15. The remote tire monitoring system of claim 14 modulation means comprises:
  groupings of one or more components mountable near the circumferential path of respective tire monitors, a each grouping producing a unique secondary modulation on the radio signals transmitted by the respective tire monitor.

16. The remote tire monitoring system of claim 14 wherein the modulation means comprises alteration means for selectively absorbing and reflecting the radio signals.

17. The remote tire monitoring system of claim 13 wherein the decoding means comprises
  a ratiometric decoder responsive to relative duration of the secondary modulation to decode position data for associating the tire monitor means with the respective wheels of the vehicle.

* * * * *